Dec. 31, 1963 R. C. MOORE 3,116,364

COLOR TELEVISION RECEIVER AND METHOD OF ADJUSTING SAME

Filed April 6, 1962

INVENTOR.
ROBERT C. MOORE
BY
Fordyce A. Bothwell
ATTORNEY

United States Patent Office 3,116,364
Patented Dec. 31, 1963

3,116,364
COLOR TELEVISION RECEIVER AND METHOD OF ADJUSTING SAME

Robert C. Moore, Huntingdon Valley, Pa., assignor to Philco Corporation, Philadelphia, Pa., a corporation of Delaware Filed Apr. 6, 1962, Ser. No. 185,694
11 Claims. (Cl. 178—5.4)

This invention relates to color television receivers and more particularly to color television receivers employing an image-producing cathode ray tube in which there is a single image-producing electron beam which is modulated by a drive signal as the beam scans screen elements emissive of light of different primary colors to produce the color image. In this type of receiver, the screen of the cathode ray tube preferably has phosphor stripes extending transverse to the direction of line scanning which are successively and repetitively excited by the beam to emit light of different primary colors (e.g. red, green and blue). Thus the color stripes may comprise successive color triplets, the stripes of each triplet successively emitting light of three primary colors. The color writing frequency (e.g. 7 mc.) is the rate at which the beam scans the color triplets, i.e. the number of triplets scanned per second. In this type of display tube index stripes are also provided on the screen, there being for example one index stripe for each color triplet.

In a color television display employing such a cathode ray tube, to obtain accurate picture reproduction, when the beam is traversing a phosphor stripe of a particular color its intensity should correspond to the intensity of that color in the elemental portion of the televised scene corresponding to that which the beam is traversing. In general, to achieve this result the received color subcarrier must be modified to provide suitable signals for application to the display tube. One way of accomplishing this is to demodulate the received color subcarrier to derive two color difference signals which are the remodulated on a carrier of a different frequency which is then supplied to the display tube to cause it to reproduce the televised picture. In such a system considerable difficulty has been experienced in the past in insuring that the phases of demodulation and remodulation are such as to yield faithful color picture reproduction when the signals are applied to the display tube.

Objects of this invention are to provide a color television receiver system, employing a display of the abovementioned type, which is readily adjustable to provide accurate color reproduction, and to provide a simple method of adjusting such a color television receiver for accurate color picture reproduction.

In accordance with the invention, in such a color television receiver two demodulators are provided for demodulating the color subcarrier in different phases. The outputs from the demodulators are applied to modulate two differently-phased symmetrical periodic waves of appropriate frequency and waveform. The resultant modulated waves are then combined and applied to control the beam intensity of the display tube. The symmetrical periodic waves are selected to have peaks corresponding to the traversal by the cathode ray beam of phosphor stripes emissive of light of different primary colors. The amplitude of each of the two symmetrical periodic waves then controls the extent to which the display chromaticity departs from white in the direction of the respective primary color stripes traversed by the beam at the time of the peaks of the respective periodic waves. In such a system a simple procedure may be followed, as set forth more fully hereinafter, to establish the phases of demodulation of the color subcarrier so that accurate color reproduction will be obtained. When this procedure is followed each symmetrical periodic wave has an amplitude controlled by the color subcarrier vector corresponding to the primary color excited at the peak of that periodic wave but not affected by the color subcarrier vector corresponding to the primary color excited at the peak of the other periodic wave. Demodulation of the color subcarrier is accomplished at a phase within 90° of the color vector which is to exert control by application of the demodulated signal to the modulation of the appropriate symmetrical periodic wave, said phase being in quadrature with the color vector which is to control the other symmetrical periodic wave amplitude.

The invention may be fully understood from the following detailed description with reference to the accompanying drawing wherein FIG. 1 is a block diagram of a color television receiver according to this invention;

Figure 1:
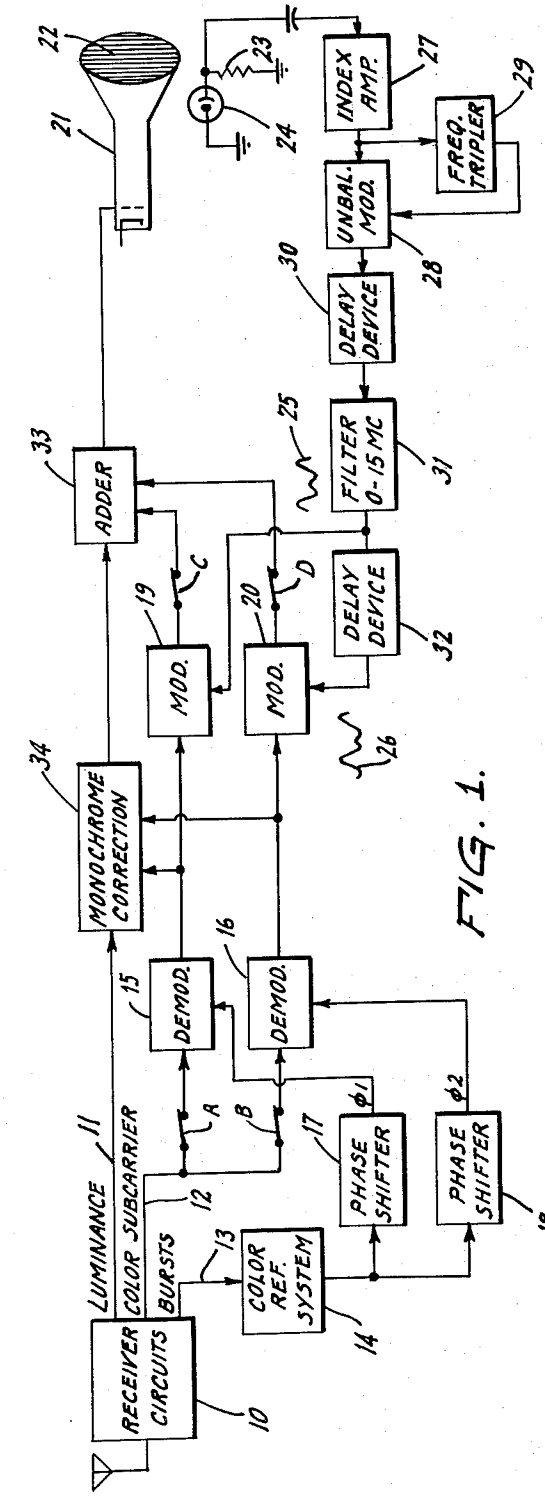

Referring first to FIG. 1, block 10 represents conventional receiver circuits by which the components of the NTSC color signal are derived. The luminance component is derived at output connection 11, the chrominance component or 3.58 mc. color subcarrier is derived at output connection 12, and the bursts are derived at output connection 13. The bursts are supplied to the color reference system represented by block 14 which produces a continuous wave reference signal having the frequency and phase of the bursts. As is well understood, the color reference system may comprise a conventional oscillator system which is synchronized by the bursts to produce the continuous wave reference signal.

In accordance with this invention, certain signals are derived by demodulation of the color subcarrier in different phase relations to the reference signal supplied by the color reference system 14. In the system arrangement shown, the chroma component is supplied to demodulators 15 and 16, and the reference signal from the color reference system 14 is also supplied to the demodulators through phase shifters 17 and 18. The signals thus derived are supplied to modulators 19 and 20 wherein they are modulated onto symmetrical periodic waves 25 and 26 derived from the scanning of index elements (at 7 mc.) on the screen cathode ray tube 21 as hereinafter described. The switches A to D are provided for easy adjustment of the receiver as later described.

The modulators may be singly-balanced modulators which are normally balanced for the waves 25 and 26. They may be of the form shown in FIG. 8–11 on page 222 of Principles of Color Television Transmissoin Systems by Wentworth, or that shown in FIG. 63(*b*) on page 42 of chapter 18 of Radio Engineering Handbook, 5th edition, by Henney, both published by McGraw-Hill Book Co., Inc., of New York. The modulating signals can be eliminated by high pass filters (not shown) following the modulators to pass the 7 mc. modulation product.

The cathode ray tube 21 is of the type previously mentioned, its image screen 22 preferably having color stripes and index stripes extending transversely to the direction of line scanning. It may be of the character shown in the Bradley et al. Patent No. 2,749,449, issued June 5, 1956, the index signal being produced across resistor 23 by photocell 24 in response to light received from the index elements of screen 22. Of course the index signal may be produced in other ways, for example by secondary electron emission as well understood in the art.

Figure 2:
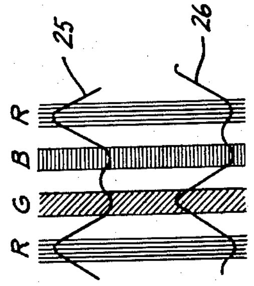
FIG. 2 is an illustration of the aforementioned waves.

The color stripes on screen 22 comprise successive triplets one of which is shown in FIG. 2. The centers of the color stripes are equally spaced, and since each triplet represents one cycle of color writing, the spacing between centers of adjacent stripes represents 120 electrical degrees.

The index signal derived from across resistor 23 has the color writing frequency (e.g. 7 mc.) and from it two symmetrical periodic waves are produced, such as shown at 25 and 26 in FIG. 2, each having fundamental and second harmonic components. Preferably these symmetrical waves are produced in the manner disclosed in the Moulton Patent No. 2,878,308, issued March 17, 1959. Thus the index signal, after amplification by amplifier 27, is supplied to an unbalanced modulator 28. The same signal is tripled in frequency in frequency tripler 29 and is supplied to modulator 28. The output of modulator 28, which may be passed through a delay device 30 and a filter 31, has the waveform 25 and is supplied to modulator 19. The same wave is supplied to a delay device 32 to derive wave 26 which is supplied to modulator 20.

The illustration of FIG. 2 indicates that the peaks of wave 25 are time coincident with beam impingement on the red stripes, while the peaks of wave 26 are time coincident with beam impingement on the green stripes. However the two waves could be phased so as to cause their peaks to be time coincident respectively with any two of the primary colors.

Figure 3:
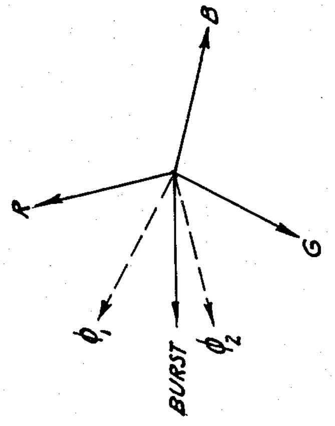
FIG. 3 is a vector diagram showing the demodulation phases.

Further in accordance with this invention, the color subcarrier is demodulated in demodulators 15 and 16 at phases in certain relation to the components of the subcarrier which represent said colors. This may be clearly seen with the aid of FIG. 3 in which the R, G and B vectors are the components of the color subcarrier which represent the colors red, green and blue, and the "burst" vector represents the phase of the burst.

With the waves 25 and 26 supplied respectively to modulators 19 and 20, phase shifter 17 is adjusted so that its output has the phase $\phi_1$ in quadrature relation to the component G of the color subcarrier and less than 90° from the component R; and phase shifter 18 is adjusted so that its output has the phase $\phi_2$ in quadrature relation to the component R of the color subcarrier and less than 90° from the component G.

It will be apparent that the same result could be achieved by shifting the phase of the subcarrier at the inputs to the demodulators, instead of shifting the phase of the reference signal.

The outputs of modulators 19 and 20 are added together and to the luminance signal in adder 33, and the resulting signal is supplied to the cathode ray tube to modulate the beam thereof. For best colorimetry in the reproduced image, portions of the demodulated chrominance signals appearing at the outputs of demodulators 15 and 16 may also be added to the luminance signal as indicated by block 34.

Thus in a color television receiver according to this invention two symmetrical periodic waves are produced from the index signal, one having peaks which are time coincident with beam impingement of elements of one color and the other having peaks which are time coincident with beam impingement of elements of another color, and the color subcarrier is demodulated at phases in the above-described relation to the components of the subcarrier representative of said colors to derive signals which are modulated onto said waves. Experimental use of this invention in a color television receiver has shown that it accomplishes the desired improvement of colorimetry of the color image.

An important feature of the color television receiver provided by this invention is that it can be readily adjusted to insure accurate color reproduction. In making the adjustment it is necessary to unbalance the modulators as described below, which is done simply by turning the balance control which is provided as shown in the aforementioned examples of balanced modulators that may be employed. The method of adjustment is as follows: First open switches A, B and D, temporarily unbalance modulator 19, and adjust delay device 30 to obtain a red field on screen 22, which means that wave 25 is correctly phased so that its peaks are time coincident with beam impingement on the red light-emissive stripes. Restore the balance of modulator 19. Then close switch D and open switch C, temporarily unbalance modulator 20, and adjust delay device 32 to obtain a green field on screen 22, which means that wave 26 is correctly phased so that its peaks are time coincident with beam impingement on the green light-emissive stripes. Restore the balance of modulator 20. Then close switches A and C and adjust phase shifter 17 so that red portions of the picture are red and green portions are gray, e.g. by use of a bar chart. Finally open switch A and close switch B and adjust phase shifter 18 so that green portions of the picture are green and red portions are gray. The receiver is now properly adjusted for demodulation of the color subcarrier at the phase $\phi_1$ and $\phi_2$.

From the foregoing description it will be seen that a color television receiver according to this invention is characterized in that it comprises means for producing a first symmetrical periodic wave 25 having peaks which are time coincident with beam impingement on elements which are emissive of light of a first color e.g. red, means for producing a second symmetrical periodic wave 26 having peaks which are time coincident with beam impingement on elements which are emissive of light of a second color e.g. green, means for demodulating the color subcarrier at a phase $\phi_1$ in quadrature relation with the component G of the subcarrier representative of said second color and within 90° of the component R of the subcarrier representative of said first color, means for modulating the resulting signal onto the first wave 25, means for demodulating the color subcarrier at a phase $\phi_2$ in quadrature relation with the component R of the subcarrier representative of said first color and within 90° of the component G of the subcarrier representative of said second color, means for modulating the resultant signal onto the second wave, and means for supplying said modulated first and second waves to the display tube to modulate the scanning electron beam.

It will also be seen that this invention involves a method of adjusting the receiver which comprises: applying one of said waves alone without modulation to the display tube, adjusting the phase of the applied wave to produce on the screen of said tube a field of one color, applying the other of said waves alone without modulation to said tube, adjusting the phase of the latter applied wave to produce on the screen of said tube a field of another color, applying the first of said waves alone with modulation to said tube, adjusting the phase of demodulation of the subcarrier to effect accurate reproduction of said first color, applying the second of said waves alone with modulation to said tube, and adjusting the phase of demodulation of the subcarrier to effect accurate reproduction of said second color.

While the invention has been described with reference to a preferred embodiment, it will be understood that the invention is not limited thereto but contemplates such modifications and other embodiments as may occur to those skilled in the art.

I claim:

1. In a color television receiver for producing a color image from a luminance signal representative of brightness and a color subcarrier having components representative of different primary colors, a color image-producing cathode ray tube wherein elements emissive of light of said colors are scanned by an electron beam at a predetermined color writing frequency, means for producing a first symmetrical periodic wave having peaks which are time coincident with beam impingement on elements which are emissive of light of a first of said colors, means for producing a second symmetrical periodic wave having peaks which are time coincident with beam impingement on elements which are emissive of light of a second of said colors, means for demodulating said subcarrier at a phase in quadrature relation with the component of the subcarrier representative of said second color and within 90° of the component of the subcarrier representative of said first color, means for modulating the resulting signal onto said first wave, means for demodulating said subcarrier at a phase in quadrature relation with the component of the subcarrier representative of said first color and within 90° of the component of the subcarrier representative of said second color, means for modulating the resulting signal onto said second wave, means for adding said luminance signal and said modulated first and second waves to produce a signal for modulation of said beam, and means for supplying the latter signal to said tube to effect the beam modulation.

2. In a color television receiver for producing a color image from a luminance signal representative of brightness and a color subcarrier having components representative of different primary colors, a color image-producing cathode ray tube wherein elements emissive of light of said colors are scanned by an electron beam at a predetermined color writing frequency, means for producing a first symmetrical periodic wave including components having said frequency and the second harmonic thereof so that the wave has peaks which are time coincident with beam impingement on elements which are emissive of light of a first of said colors, means for producing a second wave similar to said first wave but phased so that its peaks are time coincident with beam impingement on elements which are emissive of light of a second of said colors, means for demodulating said subcarrier at a phase in quadrature relation with the component of the subcarrier representative of said second color and within 90° of the component of the subcarrier representative of said first color, means for modulating the resulting signal onto said first wave, means for demodulating said subcarrier at a phase in quadrature relation with the component of the subcarrier representative of said first color and within 90° of the component of the subcarrier representative of said second color, means for modulating the resulting signal onto said second wave, means for adding said luminance signal and said modulated first and second waves to produce a signal for modulation of said beam, and means for supplying the latter signal to said tube to effect the beam modulation.

3. In a color television receiver for producing a color image from a luminance signal representative of brightness and a color subcarrier having components representative of different primary colors, a color image-producing cathode ray tube wherein elements emissive of light of said colors are scanned by an electron beam at a predetermined color writing frequency, means for producing from the scanning action of said beam an index signal having said frequency, means for producing from said index signal a first symmetrical periodic wave including components having said frequency and the second harmonic thereof so that the wave has peaks which are time coincident with beam impingement on elements which are emissive of light of a first of said colors, means for producing a second wave similar to said first wave but phased so that its peaks are time coincident with beam impingement on elements which are emissive of light of a second of said colors, means for demodulating said subcarrier at a phase in quadrature relation with the component of the subcarrier representative of said second color and within 90° of the component of the subcarrier representative of said first color, means for modulating the resulting signal onto said first wave, means for demodulating said subcarrier at a phase in quadrature relation with the component of the subcarrier representative of said first color and within 90° of the component of the subcarrier representative of said second color, means for modulating the resulting signal onto said second wave, means for adding said luminance signal of said modulated first and second waves to produce a signal for modulation of said beam, and means for supplying the latter signal to said tube to effect the beam modulation.

4. In a color television receiver for producing a color image from a luminance signal and a color subcarrier having components representative of three primary colors, a color image-producing cathode ray tube having color stripes arranged in successive triplets for transverse scanning by an electron beam at a predetermined color writing frequency, the stripes of each triplet respectively emitting light of said colors, means for producing a first symmetrical periodic wave having peaks which are time coincident with beam impingement on stripes which are emissive of light of a first of said colors, means for producing a second symmetrical periodic wave having peaks which are time coincident with beam impingement on stripes which are emissive of light of a second of said colors, means for demodulating said subcarrier at a phase in quadrature relation with the component of the subcarrier representative of said second color and within 90° of the component of the subcarrier representative of said first color, means for modulating the resulting signal onto said first wave, means for demodulating said subcarrier at a phase in quadrature relation with the component of the subcarrier representative of said first color and within 90° of the component of the subcarrier repreesntative of said second color, means for modulating the resulting signal onto said second wave, means fo radding said luminance signal and said modulated first and second waves to produce a signal for modulation of said beam, and means for supplying the latter signal to said tube to effect the beam modulation.

5. In a color television receiver for producing a color image from a luminance signal and a color subcarrier having components representative of three primary colors, a color image-producing cathode ray tube having color stripes arranged in successive triplets for transverse scanning by an electron beam at a predetermined color writing frequency, the stripes of each triplet respectively emitting light of said colors, means for producing a first symmetrical periodic wave including components having said frequency and the second harmonic thereof so that the wave has peaks which are time coincident with beam impingement on stripes which are emissive of light of a first of said colors, means for producing a second wave similar to said first wave but phased so that its peaks are time coincident with beam impingement on stripes which are emissive of light of a second of said colors, means for demodulating said subcarrier at a phase in quadrature relation with the component of the subcarrier representative of said second color and within 90° of the component of the subcarrier representative of said first color, means for modulating the resulting signal onto said first wave, means for demodulating said subcarrier at a phase in quadrature relation with the component of the subcarrier repreesntative of said first color and within 90° of the component of the subcarrier representative of said second color, means for modulating the resulting signal onto said second wave, means for adding said luminance signal and said modulated first and second waves to produce a signal for modulation of said beam, and means for supplying the latter signal to said tube to effect the beam modulation.

6. In a color television receiver for producing a color image from a luminance signal and a color subcarrier having components representative of three primary colors, a color image-producing cathode ray tube having color stripes arranged in successive triplets for transverse scanning by an electron beam at a predetermined color writing frequency, the stripes of each triplet respectively emitting light of said colors, means for producing from the scanning action of said beam an index signal having said frequency, means for producing from said index signal a first symmetrical periodic wave including components having said frequency and the second harmonic thereof so that the wave has peaks which are time coincident with beam impingement on stripes which are emissive of light of a first of said colors, means for producing a second wave similar to said first wave but phased so that its peaks are time coincident with beam impingement on stripes which are emissive of light of a second of said colors, means for demodulating said subcarrier at a phase in quadrature relation with the component of the subcarrier representative of said second color and within 90° of the component of the subcarrier representative of said first color, means for modulating the resulting signal onto said first wave, means for demodulating said subcarrier at a phase in quadrature relation with the component of the subcarrier representative of said first color and within 90° of the component of the subcarrier representative of said second color, means for modulating the resulting signal onto said second wave, means for adding said luminance signal and said modulated first and second waves to produce a signal for modulation of said beam, and means for supplying the latter signal to said tube to effect the beam modulation.

7. In a color television receiver for receiving a color television signal including a color subcarrier having components representative of different primary colors, a color image-producing cathode ray tube wherein elements emissive of light of said colors are scanned by an electron beam at a predetermined color writing frequency, means for producing a first symmetrical periodic wave having peaks which are time coincident with beam impingement on elements which are emissive of light of a first of said colors, means for producing a second symmetrical periodic wave having peaks which are time coincident with beam impingement on elements which are emissive of light of a second of said colors, means for demodulating said subcarrier at a phase in quadrature relation with the component of the subcarrier representative of said second color and within 90° of the component of the subcarrier representative of said first color, means for modulating the resulting signal onto said first wave, means for demodulating said subcarrier at a phase in quadrature relation with the component of the subcarrier of said first color and within 90° of the component of the subcarrier representative of said second color, means for modulating the resulting signal onto said second wave, and means for supplying said modulated first and second waves to said tube to modulate said electron beam.

8. In a color television receiver for receiving a color television signal including a color subcarrier having components representative of different primary colors, a color image-producing cathode ray tube wherein elements emissive of light of said colors are scanned by an electron beam at a predetermined color writing frequency, the stripes of each triplet respectively emitting light of said colors, means for producing from the scanning action of said beam an index signal having said frequency, means for producing from said index signal a first symmetrical periodic wave including components having said frequency and the second harmonic thereof so that the wave has peaks which are time coincident with beam impingement on stripes which are emissive of light of a first of said colors, means for producing a second wave similar to said first wave but phased so that its peaks are time coincident with beam impingement on stripes which are emissive of light of a second of said colors, means for demodulating said subcarrier at a phase in quadrature relation with the component of the subcarrier representative of sad second color and within 90° of thet component of the subcarrier representative of said first color, means for modulating the resulting signal onto said first wave, means for demodulating said subcarrier at a phase in quadrature relation with the component of the subcarrier representative of said first color and within 90° of the component of the subcarrier representative of said second color, means for modulating the resulting signal onto said second wave, and means for supplying said modulated first and second waves to said tube to modulate said electron beam.

9. In a color television receiver in which two phase-displaced symmetrical periodic waves having peaks are modulated with color information signals derived by demodulation of a color subcarrier at two different phases each intended to be in quadrature relation with one of two color components of the subcarrier and within 90° of the other of said components, and the modulated waves are applied to a color image-producing cathode tube wherein elements emissive of light of different primary colors are scanned by an electron beam, the method of adjusting said receiver for accurate color reproduction which comprises: applying one of said waves alone without modulation to said tube, adjusting the phase of the applied wave to produce on the screen of said tube a field of one of said colors, applying the other of said waves alone without modulation to said tube, adjusting the phase of the latter applied wave to produce on the screen of said tube a field of another of said colors, applying the first of said waves alone with modulation to said tube, adjusting the phase of demodulation of the subcarrier to effect accurate reproduction of said first color, applying the second of said waves alone with modulation to said tube, and adjusting the phase of demodulation of the subcarrier to effect accurate reproduction of said second color.

10. In a color television receiver including two demodulators for demodulating a color subcarrier at two different phases each intended to be in quadrature relation with one of two color components of the subcarrier and within 90° of the other of said components, a source of two symmetrical periodic waves having peaks, two modulators for modulating the outputs of said demodulators onto said waves, and a color image-producing tube to which said waves are applied and in which elements emissive of light of different colors are scanned by an electron beam, the method of adjusting said receiver for accurate color reproduction which comprises: applying one of said waves alone without modulation to said tube, adjusting the phase of the applied wave to produce on the screen of said tube a field of one of said colors, applying the other of said waves alone without modulation to said tube, adjusting the phase of the latter applied wave to produce on the screen of said tube a field of another of said colors, applying the first of said waves alone with modulation to said tube, adjusting the phase of demodulation of the subcarrier to effect accurate reproduction of said first color, applying the second of said waves alone with modulation to said tube, and adjusting the phase of demodulation of the subcarrier to effect accurate reproduction of said second color.

11. In a color television receiver wherein the color image is produced by screen elements emissive of light of different primary colors which are scanned by an electron beam, and a received color subcarrier is demodulated at two different phases each intended to be in quadrature relation with one of two color components of the subcarrier and within 90° of the other of said components, and the resulting signals are modulated onto two phase-displaced symmetrical periodic waves having peaks which are time coincident respectively with beam impingement on elements emissive of colored light of two colors, and the modulated waves are caused to modulate said beam, the method of establishing the proper phases for demodulation of said subcarrier which comprises: causing one of said modulated waves alone to modulate said beam, adjusting the phase of demodulation of the color subcarrier to effect accurate reproduction of one of said two colors, causing the other of said modulated waves alone to modulate said beam, and adjusting the phase of demodulation of the color subcarrier to effect accurate reproduction of the other of said two colors.

No references cited.